US009745424B2

(12) United States Patent
Freitag et al.

(10) Patent No.: US 9,745,424 B2
(45) Date of Patent: Aug. 29, 2017

(54) INSOLUBLE AND BRANCHED POLYPHOSPHONATES AND METHODS RELATED THERETO

(75) Inventors: Dieter Freitag, Chelmsford, MA (US); Pin Go, Lowell, MA (US)

(73) Assignee: FRX POLYMERS, INC., Chelmsford, MA (US)

( * ) Notice: Subject to any disclaimer, the term of this patent is extended or adjusted under 35 U.S.C. 154(b) by 1105 days.

(21) Appl. No.: 12/182,590

(22) Filed: Jul. 30, 2008

(65) Prior Publication Data
US 2009/0032770 A1    Feb. 5, 2009

Related U.S. Application Data

(60) Provisional application No. 60/952,608, filed on Jul. 30, 2007.

(51) Int. Cl.
*C08G 79/04* (2006.01)
*C08L 85/02* (2006.01)
*C08L 67/03* (2006.01)

(52) U.S. Cl.
CPC .............. *C08G 79/04* (2013.01); *C08L 85/02* (2013.01); *C08L 67/03* (2013.01)

(58) Field of Classification Search
USPC ........................ 528/398, 400, 167
See application file for complete search history.

(56) References Cited

U.S. PATENT DOCUMENTS

| 2,682,522 | A | 6/1954 | Coover, Jr. et al. |
| 2,716,101 | A | 8/1955 | Coover, Jr. et al. |
| 3,326,852 | A | 6/1967 | Thomas |
| 4,328,174 | A | 5/1982 | Schmidt et al. |
| 4,331,614 | A | 5/1982 | Schmidt et al. |
| 4,374,971 | A | 2/1983 | Schmidt et al. |
| 4,415,719 | A | 11/1983 | Schmidt et al. |
| 4,762,905 | A | 8/1988 | Schmidt et al. |
| 5,216,113 | A | 6/1993 | Schulz-Schlitte et al. |
| 5,334,692 | A | 8/1994 | Hess et al. |
| 6,861,499 | B2 | 3/2005 | Vinciguerra et al. |
| 2006/0020104 | A1* | 1/2006 | Freitag ........................ 528/398 |
| 2007/0032633 | A1* | 2/2007 | Freitag et al. ................ 528/398 |

FOREIGN PATENT DOCUMENTS

WO   WO 2004/076536 A1   9/2004
WO   WO 2009/018336 A2   2/2009

* cited by examiner

*Primary Examiner* — Rachel Kahn
(74) *Attorney, Agent, or Firm* — Pepper Hamilton LLP

(57) ABSTRACT

Insoluble polyphosphonates produced via a transesterification process, methods for preparing such insoluble polyphosphonates and polymer compositions and articles of manufacture including such insoluble polyphosphonates are described herein.

12 Claims, No Drawings

INSOLUBLE AND BRANCHED POLYPHOSPHONATES AND METHODS RELATED THERETO

CROSS-REFERENCE TO RELATED APPLICATIONS

Not applicable

This application claims priority from U.S. Provisional Application No. 60/952,608 entitled "Synthesis of Insoluble and Branched Polyphosphonates that Exhibit an Advantageous Combination of Properties, and Methods Related Thereto" filed Jul. 30, 2007, the contents of which are hereby incorporated by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

1. Field of Invention

The present invention relates generally to insoluble branched polyphosphonates and methods for their preparation. It also relates to polymer compositions including these insoluble polyphosphonates and articles produced therefrom.

2. Description of Related Art

Polyphosphonates exhibit excellent fire resistance (e.g., U.S. Pat. Nos. 2,682,522 and 4,331,614). Generally, linear polyphosphonates are produced by melt condensing a phosphonic acid diaryl ester and a bisphenol using a metal catalyst (e.g., sodium phenolate) at high temperature (e.g., U.S. Pat. No. 2,682,522). However, this approach produced low molecular weight polyphosphonates that exhibited poor toughness.

To improve toughness, methods for producing branched polyphosphonates by transesterification were developed. In the transesterification reaction, a phosphonic acid diaryl ester, bisphenol, a branching agent such as tri or tetra phenol or phosphoric acid ester and a catalyst, such as sodium phenolate are combined and reacted in the melt, usually in an autoclave (e.g., U.S. Pat. Nos. 2,716,101; 3,326,852; 4,328,174; 4,331,614; 4,374,971; 4,415,719; 5,216,113; 5,334,692; and 4,374,971). This approach was successful in producing high molecular weight polyphosphonates that exhibited improved toughness, but processability was sacrificed. For example, branched polyphosphonates with a number of average molecular weights ($M_n$) of from 11,000 g/mole to as high as 200,000 g/mole with polymer dispersities of less than 2.5 have been described. However, these polyphosphonates exhibited high melt viscosities, lack of hydrolytic stability and exhibit a haze in the material. Consequently, the combination of properties exhibited by these polyphosphonates are not sufficient for general acceptance in the marketplace.

More recently, a method to synthesize branched polyphosphonates with an improved combination of properties such as higher Tgs, better toughness and superior hydrolytic stability has been developed using a phosphonium catalyst such as tetraphenylphosphonium phenolate (TPPP) (U.S. Pat. No. 6,861,499). These polyphosphonates exhibit very high molecular weight, good melt processability and, depending on the reaction conditions used, can be soluble or insoluble. Unfortunately, TPPP has several disadvantages in that it is expensive and the reaction time required to make polymers using this catalyst is slower compared to sodium phenolate resulting in higher costs to produce polyphosphonates. In addition, TPPP is volatile under the reaction conditions and has to be added periodically to maintain a sufficient concentration.

SUMMARY OF THE INVENTION

Embodiments of the invention presented herein are directed to a method for producing branched insoluble polyphosphonates including the steps of combining one or more phosphonic acid diaryl esters, one or more bisphenol and an alkali catalyst in a reaction vessel to form a reaction mixture; heating the reaction mixture for a first time under vacuum to a temperature where phenol begins to distill from the vessel and continuing heating until evolution of phenol has stopped; and heating the reaction mixture for a second time to a temperature where evolution of at least phenol has restarted and has stopped and a resulting material has been generated that is partially or completely insoluble in methylene chloride or tetrahydrofuran after 8 hours of immersion. In various embodiments, the step of heating the reaction mixture for a second time may be carried out for a time that is at least equal to the step of heating the reaction mixture for a first time, and in some embodiments, the step of heating the reaction mixture for a first time and heating the reaction mixture for a second time may be carried out concurrently such that heating is uninterrupted. In certain embodiments, a melt viscosity of the reaction mixture may increase by at least about 10 times during the step of heating the reaction mixture for a second time.

In some embodiments, the reaction mixture may include up to about 20 mole % molar excess of the bisphenol or up to about 20 mole % molar excess of the phosphonic acid diaryl ester. In particular embodiments, the catalyst may be sodium associated with an anion, and in some embodiments, the alkali catalyst may be sodium phenolate. In certain embodiments, the reaction mixture may also include a branching agent, and in some embodiments, the branching agent may be 1,1,1-tris(4-hydroxyphenyl)ethane. The phosphonic acid diaryl ester of various embodiments, may be of general structure:

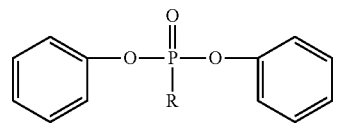

where R is a lower alkyl aliphatic hydrocarbon, a $C_1$-$C_4$, cycloaliphatic or aromatic, and the bisphenol may be selected from 4,4'-dihydroxybiphenyl, 2,2-bis(4-hydroxyphenyl)propane (bisphenol A), 1,1-bis(4-hydroxyphenyl)-3,3-dimethyl-5-methyl cyclohexane (TMC), 1,3-dihydroxybenzene (resorcinol), 1,4-dihydroxybenzene (hydroquinone) and combinations thereof.

Some embodiments of the invention are directed to an insoluble branched polyphosphonate prepared by a method including the steps of combining one or more phosphonic acid diaryl esters, one or more bisphenol and a sodium catalyst in a reaction vessel to form a reaction mixture; heating the reaction mixture for a first time under vacuum to a temperature where phenol begins to distill from the vessel and continuing heating until evolution of phenol has stopped; and heating the reaction mixture for a second time to a temperature where evolution of at least phenol has restarted and has stopped and a resulting material has been generated that is partially or completely insoluble in methylene chloride or tetrahydrofuran after 8 hours of immersion. In certain embodiments the step of heating the reaction mixture for a second time may be carried out for a time that is at least equal to the step of heating the reaction mixture for a first time, and in some embodiments, a melt viscosity of the reaction mixture may increase by at least about 10 times during the step of heating the reaction mixture for a second time. In other embodiments, the reaction mixture may include up to about 20 mole % molar excess of the bisphenol or up to about 20 mole % molar excess of the phosphonic acid diaryl ester. In particular embodiments, the insoluble polyphosphonate prepared may not be soluble in methylene chloride at 23° C., and in some embodiments, the insoluble polyphosphonate may exhibit a Tg of at least 100° C. as measured by differential scanning calorimetry. In other embodiments, the insoluble polyphosphonate may be both insoluble and meltable.

Other embodiments of the invention are directed to a polymer composition, comprising at least one branched insoluble polyphosphonate prepared as described above and at least one other polymer selected from polycarbonates, polyacrylates, polyacrylonitriles, polyesters, polyamides, polystyrenes, polyurethanes, polyureas, polyepoxies, poly(acrylonitrile butadiene styrene)s, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, polyethers, polyphenylene oxides, cellulose polymers and combinations thereof. In some embodiments, the polymer composition may be an article of manufacture selected from fibers, films, coatings, moldings, adhesives, foams, fiber reinforced articles and combinations thereof.

DESCRIPTION OF DRAWINGS

Not applicable

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims.

It must be noted that, as used herein, and in the appended claims, the singular forms "a", "an" and "the" include plural reference unless the context clearly dictates otherwise. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications and references mentioned herein are incorporated by reference. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 45%-55%.

"Optional" or "optionally" may be taken to mean that the subsequently described structure, event or circumstance may or may not occur, and that the description includes instances where the event occurs and instances where it does not.

The terms "flame retardant," "flame resistant," "fire resistant" or "fire resistance," as used herein, mean that the composition exhibits a limiting oxygen index (LOI) of at least about 27 and/or a flame reference standard for electronic compositions UL-94.

The term "heat distortion temperature" or "HDT" as used herein means the temperature at which a standard test bar deflects under a stated load.

The term "good toughness" or the like as used herein means that a specimen molded from the polymer or polymer composition exhibits a fracture energy that is comparable to that of a specimen prepared from a state-of-the-art polymer or from a host polymer alone.

The term "insoluble" as used herein means that the polyphosphonate will not fully dissolve in methylene chloride after an 8 hour immersion.

The term "hydrolytic stability" as used herein means the polyphosphonate can form less than 5% degradation products, has less than 5% loss of transparency or less than 5% loss in strength when heated in boiling water for about 6 hours.

Embodiments of the invention presented herein are generally directed to methods for preparing flame retardant, insoluble polyphosphonates having an improved combination of properties by transesterification. Various embodiments of such methods include the step of reacting one or more phosphonic acid diaryl esters, one or more bisphenols and, optionally, a branching agent in the presence of a sodium catalyst. The insoluble polyphosphonates of the invention provide fire resistant plastics that may be useful for a variety of applications. For example, the polyphosphonates of the invention may exhibit better performance in the UL test, lower burning time and no drip, compared to soluble polyphosphonates.

Further embodiments of the invention include articles of manufacture prepared from the insoluble polyphosphonates and other engineering plastics blending these insoluble polyphosphonates including the insoluble polyphosphonates of the invention. For example, the insoluble polyphosphonates and polymer blends can be used as coatings, or they can be used to fabricate free-standing films, fibers, foams, molded articles, and fiber reinforced composites.

In various embodiments, the method for preparing insoluble polyphosphonates may at least include the steps of combining one or more phosphonic acid diaryl esters, one or more bisphenols and optionally one or more branching agents in a reaction vessel to form a reaction mixture and reacting these components in a polymerization reaction. In some embodiments, a sodium catalyst, such as, for example, sodium phenolate, may be added to the reaction mixture. In such embodiments, no phosphonium catalyst is required. Therefore, the method embodied by the invention may be more economically attractive because phenolate catalysts are generally less expensive compared to phosphonium catalysts while the reaction time is fast and the yield of polymer is higher and has improved flame retardancy.

In particular embodiments, the reaction components may be combined such that a stoichiometric imbalance of phosphonic acid diaryl ester to bisphenol exists. For example, in some embodiments, the reaction mixture may contain a stoichiometric imbalance ratio (i.e. molar ratio) corresponding to about 20 mole % excess of the phosphonic acid diaryl ester to bisphenol, and in other embodiments, the reaction mixture may contain a stoichiometric imbalance of about 20 mole % less phosphonic acid diaryl ester to bisphenol. In still other embodiments, the phosphonic acid diaryl ester may be up to about 5 mole % excess or up to about 5 mole % less than bisphenol.

Nearly any phosphonic acid diaryl ester may be used in the method of embodiments of the invention. For example, in some embodiments, phosphonic acid diaryl ester may be of general formula:

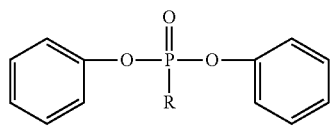

wherein R may be a lower alkyl aliphatic hydrocarbon, such as, $C_1$-$C_4$ alkyl, a $C_5$-$C_{10}$ cycloaliphatic or $C_5$-$C_{10}$ aryl. For example, in certain embodiments, the phosphonic acid diaryl ester may be methyldiphenoxyphosphine oxide:

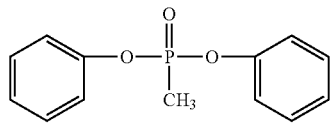 [SMILES: CP(=O)(Oc1ccccc1)Oc1ccccc1]

Similarly, the method of various embodiments of the invention can be used with any bisphenol. For example, the bisphenol of some embodiments may include, but are not limited to commercially available such as 4,4'-dihydroxybiphenyl, 4,4'-dihydroxyphenyl sulfone, 2,2-bis(4-hydroxyphenyl)propane (bisphenol A), 4,4'-dihydroxyphenyl ether, 9,9-dihydroxy-phenylfluorene and 1,1-bis(4-hydroxyphenyl)-3,3-dimethyl-5-methyl cyclohexane (TMC):

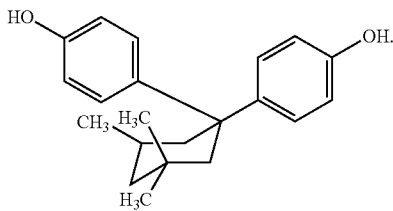 [SMILES: CC1CC(C)(C)CC(c2ccc(O)cc2)(c2ccc(O)cc2)C1]

Additionally, copolymers prepared using two or more different bisphenols can also be prepared using the method of some embodiments of the invention. For example, in certain embodiments, copolymers may be prepared using a combination of bisphenols in which at least 10 mole % bisphenol A is used.

A variety of catalysts are known and may be used in embodiments of the invention, and in particular embodiments, alkali catalysts such as, for example, sodium phenolate may be used. In some embodiments, the alkali catalyst may be associated with one or more moles of water, the disodium salt of bisphenol A and/or other sodium salts. The amount of catalyst provided in the reaction mixture may vary, and it is well within the purview of the skilled artisan to determine the amount of catalyst used in the reaction. For example, in some embodiments, the molar amount of catalyst used is from about 0.00004 moles to about 0.001 moles per 1 mole of bisphenol.

In some embodiments, the reaction mixture may further include one or more branching agents. In general, a branching agent may contain at least two functional groups such as, for example, hydroxyl or phosphorus ester. For example, suitable branching agents useful in embodiments of the invention include, but are not limited to, 1,1,1-tris(4-hydroxyphenyl)ethane, trisphenyl phosphate, oligomeric isopropanyl phenol and the like. In particular embodiments, the branching agent may be 1,1,1-tris(4-hydroxyphenyl)ethane. The amount of branching agent provided may vary in embodiments of the invention. For example, the molar amount of branching agent used is from about 0.0005 moles to about 0.030 moles or, in some embodiments, about 0.0010 moles to about 0.020 moles per 1 mole of bisphenol.

In certain embodiments, branched polyphosphonates may be prepared without the addition of a branching agent when bisphenol A is used because bisphenol A may undergo a secondary reaction that produces compounds and oligomers containing multiple hydroxy groups that can function as branching agents. Thus, in such embodiments, a branching agent may be formed in-situ.

The polymerization reaction may generally be conducted at a high temperature in the melt under vacuum, and the reaction temperature and pressure may be adjusted at one or more stages during the course of the reaction. For example, in some embodiments, the reaction temperature may be from about 200° C. to about 400° C., and in other embodiments, the reaction temperature may be from about 250° C. to about 300° C.

In particular embodiments, the reaction may take place in at least two stages. In a first stage, the polymerization reaction may proceed at under appropriate reaction conditions to evolution of phenol has begun and has stopped from the reaction mixture. In such embodiments, the first stage may result in a polyphosphonate that is soluble. In a second stage or "post reaction," the polymerization reaction may continue for a period of time such that evolution of phenol and other monomers restarts and has stopped. After the second stage, the polyphosphonate has become insoluble.

In general, the second stage may be an extension of the first stage such that the reaction conditions for the first and second stages are the same. Without wishing to be bound by theory, the length of the reaction may dictate the production of a soluble polyphosphonate or an insoluble polyphosphonate. For example, in some embodiments, the reaction temperature for the first stage may be between 200° C. and 400° C. and the pressure may be from about 760 mm Hg to about 0.3 mm Hg or less, and the reaction temperature for the second stage may also be between 200° C. and 400° C. and the pressure may be from about 760 mm Hg to about 0.3 mm Hg or less. In other embodiments, the reaction temperature of the first and second stages may be different. For example, the reaction temperature of the second stage may be at least equal to or higher than the reaction temperature of the first stage, and the pressure for the second stage may be at least equal to or lower than the first stage.

As described above, the polymerization reaction may be carried out for any amount of time and may be terminated when the polyphosphonates being formed have become insoluble. The time required for the polyphosphonates to become insoluble may vary and may depend upon the reaction conditions and/or the size of the reaction. For example, a polymerization reaction that is carried out at a lower temperature and/or higher pressure may require a longer reaction time when compared to a polymerization reaction carried out at a higher reaction temperature and/or lower pressure. Generally, the change in solution viscosity may be monitored throughout the reaction to determine the point at which the polyphosphonate becomes insoluble. Therefore, as the polymerization reaction proceeds, the solution viscosity will increase until the polyphosphonate becomes insoluble.

In a more specific example, a reaction including 2-2.8 kg of starting material may be polymerized under appropriate conditions for from about 5 hours to about 6 hours in a first stage resulting in a soluble polyphosphonate having a viscosity as determined by torque of about 0.3 to about 0.4. The same reaction may then be subjected to a second stage of polymerization of from about 7 hours to about 10 hours under the same or similar reaction conditions for a total reaction time of about 12 hours to about 16 hours. During the second stage, the viscosity of the polyphosphonate may increase to about 12 to about 13. The reaction times provided above are for example only. It is noted that the reaction time may vary depending on, for example, the amount of starting materials and/or the reaction conditions. Thus, a reaction including greater that 2.8 kg of starting material may require an increased first and/or second reaction time, and similarly, the reaction times may be reduced if the size of the reaction is reduced. However, in general, at least about doubling the reaction time may result in an increase in the melt viscosity of the polyphosphonate of at least about 10 times. In some embodiments, the melt viscosity may increase by at least about 20 times during the second stage, and in others, the melt viscosity may increase by about 30 to 40 times during the second stage.

Because the polymerization reaction is carried out for a longer period of time, the polyphosphonates prepared by methods of embodiments described herein may have a higher molecular weight than polyphosphonates previously described in which the polymerization reaction is terminated before the polyphosphonate becomes insoluble. Additionally, this higher molecular weight may result in polyphosphonates that have higher Tgs and that are more hydrolytically stable than previously described polyphosphonates.

Generally, the method of embodiments described above may result in insoluble polyphosphonates that exhibit outstanding flame resistance, high thermal stability and good toughness when compared with state-of-the-art polyphosphonates which are usually soluble in methylene chloride. The polyphosphonates prepared as described herein may also exhibit improved Tgs over state-of-the-art polyphosphonates. For example, branched polyphosphonates prepared from methyldiphenoxyphosphine oxide and 2,2-bis(4-hydroxyphenyl)propane (bisphenol A) in keeping with embodiments of the invention may exhibit Tgs of at least about 100° C. whereas polyphosphonates prepared by state-of-the-art process typically exhibit Tgs that are less than 100° C. Additionally, the polyphosphonates of embodiments of the invention may exhibit excellent melt processability thereby providing a polyphosphonate that is both insoluble and meltable. Such characteristics have not been demonstrated in polymers described to date.

The insoluble polyphosphonates of the invention may be used in the preparation of polymer compositions having advantageous characteristics. For example, in some embodiments insoluble polyphosphonates prepared as described above may be included in polymer compositions that contain one or more additional or other polymers. As used herein, the term "polymer composition" may refer to a composition including at least one insoluble polyphosphonate prepared as described above and at least one other polymer. The term "other polymer" may refer to any polymer such as, for example, commodity or engineering plastics, other than the insoluble polyphosphonates. Examples of "other polymers" include, but are not limited to, various polycarbonates, polyacrylates, polyacrylonitriles, polyesters, polyamides, polystyrenes (including high impact strength polystyrenes), polyurethanes, polyureas, polyepoxies, poly(acrylonitrile butadiene styrene)s, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, cellulose polymers and copolymers and combinations thereof.

The polymer compositions of embodiments of the invention may be produced by any method known in the art. For example, the insoluble polyphosphonates of the invention may be combined with one or more other polymers using blending, mixing, compounding, extrusion and the like or combinations thereof.

In some embodiments, the insoluble polyphosphonates and polymer compositions of the invention may further include one or more other components such as, for example, fillers, glass, surfactants, organic binders, polymeric binders, crosslinking agents, coupling agents, anti-dripping agents, Teflon, colorants, inks, dyes and combinations thereof. For example, in some exemplary embodiments, the polymer composition may include one or more polyphosphonates prepared as described above, polybutylene terephthalte (PBT), glass fiber and teflon.

Such other components may be added to the insoluble polyphosphonates or polymer compositions by known methods such as, for example, blending, mixing, compounding, extrusion and the like or combinations thereof, and the other components may be added at any point during the preparation of either the insoluble polyphosphonates or the polymer compositions. For example, one or more other components may be added during mixing or blending of the insoluble polyphosphonate with one or more other polymers or the other components may be added after the polymer composition has been combined.

The insoluble polyphosphonates or the polymer compositions of the invention can be used for a variety of purposes, and in particular embodiments, the polyphosphonates or polymer compositions may be used to prepare articles suited for applications requiring fire resistance. For example, in some embodiments, the insoluble polyphosphonates can be used as coatings, and in other embodiments, they can be used to fabricate articles such as free-standing films, fibers, foams, molded articles and fiber reinforced composites. In embodiments in which the insoluble polyphosphonates or polymer compositions are used to make fiber reinforced composites, the reinforcement may be continuous, woven, or chopped fibers prepared from materials including, but not limited to, glass, carbon, silicon carbide and organic fibers or combinations thereof. In certain embodiments, the materials described herein may be useful in applications in the automotive and electronic industries that require outstanding fire retardancy and high temperature performance.

EXAMPLES

The above summary of the present invention is not intended to describe each illustrated embodiment or every implementation of the present invention. The detailed description, which follows, particularly exemplifies these embodiments.

EXAMPLES

Having generally described the invention, a more complete understanding thereof may be obtained by reference to the following examples that are provided for purposes of illustration only and do not limit the invention.

Example 1

State of the Art: Preparation of Branched Polyphosphonates Using Phenolate Catalyst A branched polyphosphonate was prepared as described in U.S. Pat. No. 4,415,719 using the reaction scheme:

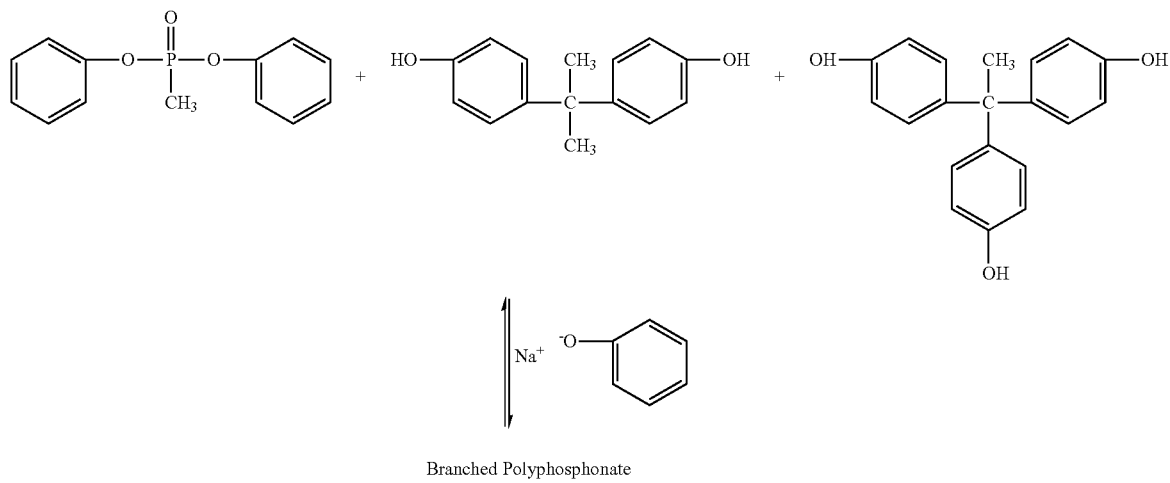

Branched Polyphosphonate

A reaction mixture containing 33.28 g (0.1457 moles) 2,2-bis(4-hydroxyphenyl)propane (bisphenol A), 37.07 g (0.1493 mole) methylphosphonic acid diphenyl ester and 0.006 g ($5.16 \times 10^{-5}$ moles) sodium phenolate and 0.459 g ($1.5 \times 10^{-3}$ moles) of 1,1,1-tris(4-hydroxyphenyl)ethane (branching agent) was prepared. This reaction mixture contains a 2.4 mole % molar excess of bisphenol A relative to phosphonic ester and $3.54 \times 10^{-4}$ moles of sodium phenolate per 1 mole of bisphenol A. This reaction mixture was heated to from 250° C. to 300° C. under vacuum for approximately 8 hours.

The polymer isolated was not as tough as the polymers described in Examples 2 and 3. A 0.5% solution of the polymer in methylene chloride exhibited a relative viscosity of about 1.09 at 23° C., and a film cast from methylene chloride solution exhibited a Tg of about 91° C. by DSC with low toughness and yellow color.

Example 2

State of the Art: Preparation of Polyphosphonates Using a Tetraphenylphosphonium Catalyst as Described in EP 04714123.0

Into a 12 L reactor equipped with a distillation column and mechanical stirrer was placed 3.329 kg 2,2-bis-(4-hydroxyphenyl)propane (bisphenol A), 1.2 g tetraphenylphosphonium phenolate catalyst, 89 g 1,1,1 Tris(4-hydroxyphenyl)ethane and 3.581 kg methylphosphonic acid diphenyl ester. Phenol (0.224 kg) is evolved from methylphosphonic acid diphenyl ester and is also present in the reaction mixture. The mixture was heated to from 250° C. to 300° C. while reducing the pressure from 150 to 1.5 mm Hg over about a 14.5 hour period. A noticeably rapid increase in solution viscosity of the melt was observed over the last hour of the reaction.

Approximately 3428 g of distillate was collected over the course of the reaction. The polyphosphonate was extruded out of the reactor as a strand and cut into granules using a granulator. The yield of polyphosphonate out of the reactor was 3560 g and was 10.8% phosphorous. The polyphosphonate was transparent, colorless and tough and was not fully soluble in $CH_2Cl_2$ after 8 hours of immersion. The polymer exhibited a Tg of 97° C. and an LOI (limited oxygen index) of about 65.

Example 3

Preparation of Insoluble Polyphosphonates Using Sodium Phenolate Catalyst

Into a 12 L reactor equipped with a distillation column and mechanical stirrer was placed the 3.329 kg 2,2-bis-(4-hydroxyphenyl)propane (bisphenol A), 0.6 g sodium phenolate catalyst, 89 g 1,1,1 tris(4-hydroxyphenyl)ethane and 3.581 kg methylphosphonic acid diphenyl ester. Phenol (0.093 kg) is evolved from methylphosphonic acid diphenyl ester and is also present in the reaction mixture. The mixture was heated from 250° C. to 300° C. while reducing the pressure from 150 to 1.5 mm Hg over about a 14 hour period. A noticeably rapid increase in solution viscosity of the melt was observed over the last hour of the reaction.

Approximately 3253 g of distillate was collected over the course of the reaction. The polyphosphonate was extruded out of the reactor as a strand and cut into granules by granulator. The yield of polyphosphonate out of the reactor was 3748 g with a percentage of phosphorous of about 10.8%. The polyphosphonate was transparent, colorless and tough and was not fully soluble in $CH_2Cl_2$ after 8 hours of immersion. The polymer exhibited a Tg of 100° C. and an LOI (limited oxygen index) of about 65.

Example 4

State of the Art: Preparation of Polyphosphonates Using a Tetraphenylphosphonium Catalyst as Described in EP 04714123.0

Into a 6 L reactor equipped with a distillation column and mechanical stirrer was placed the 1.308 kg (5.737 moles) of 2,2-bis-(4-hydroxyphenyl)propane (bisphenol A), 35.1 g (0.115 moles) 1,1,1 tris(4-hydroxyphenyl)ethane, 1.467 g (5.915 moles) of distilled methylphosphonic acid diphenyl ester and 450 mg tetraphenylphosphonium phenolate (TPPP) catalyst which is a complex of tetraphenylphosphonium phenolate and phenol consisting of about 70% and about 30%, respectively, of each. The mixture was heated from 250° C. to 300° C. while reducing the pressure from 150 to 1.5 mm Hg over about a 15.25 hour period. The distillate was collected. A noticeably rapid increase in solution viscosity of the melt was observed over the last hour of the reaction. At the end, a torque of 13.5±1.5 at 300° C. and 110 rpm stirrer speed was determined as a measurement of melt viscosity.

Approximately 1238 g of distillate was collected over the course of the reaction. The polymer was extruded out of the reactor into a water bath to form a strand that was subsequently pelletized. The yield of polymer out of the reactor was 1591 g. The polymer was transparent, colorless and tough having a phosphorous content of 10.8% and a Tg of 104° C. The polymer was not fully soluble in methylene chloride after 12 hours.

Example 5

Preparation of Insoluble Polyphosphonates Using a Sodium Phenolate Catalyst

Into a 6 L reactor equipped with a distillation column and mechanical stirrer was placed the 1.308 kg (5.737 moles) of 2,2-bis-(4-hydroxyphenyl)propane (bisphenol A), 130 mg sodium phenolate catalyst, 35.4 g (0.115 moles) 1,1,1 tris (4-hydroxyphenyl)ethane and 1.458 g (5.879 moles) of distilled methylphosphonic acid diphenyl ester. The mixture was heated from 250° C. to 300° C. while reducing the pressure from 150 to 1.5 mm Hg over about a 12.5 hour period. The distillate was collected. A noticeably rapid increase in solution viscosity of the melt was observed over the last hour of the reaction. At the end, a torque of 14.6±1.5 at 300° C. and 110 rpm stirrer speed was determined as a measurement of melt viscosity.

Approximately 1223 g of distillate was collected over the course of the reaction. The polymer was extruded out of the reactor into a water bath to form a strand that was subsequently pelletized. The yield of polymer out of the reactor was 1542 g. The polymer was transparent, colorless and tough having a phosphorous content of 10.8% and a Tg of 102° C. The polymer was not fully soluble in methylene chloride after 12 hours.

Example 6

Comparison of Hydrolytic Stability (Example 1 and Example 3)

This example illustrates the improved hydrolytic stability of branched insoluble polyphosphonates of the present invention (Example 3) compared to that of the soluble branched polyphosphonate of Example 1.

A molded sample (approximately 2 cm×2 cm×1 cm thick) of the polyphosphonates prepared as described in Example 1 and Example 3 was placed in distilled water and heated to 100° C. for 6 hours. Prior to the water exposure, the samples were transparent and in a single piece. After exposure, the soluble polyphosphonate molding from Example 1 had broken into several smaller pieces that had a frosty white opaque surface and appeared to have foamed presumably due to generation of volatiles. The small pieces were fragile and fractured easily upon handling. The insoluble polyphosphate molding from Example 3 remained in one piece and exhibited a slight amount of whitening on one side of the material with little reduction in visual transparency. The polymer of Example 3 showed better toughness, higher Tg and superior hydrolytic stability than the polymer of Example 1.

Example 7

Comparison of Properties (Example 2, Example 3, Example 4 and Example 5)

The results presented in Table 1 are a comparison of the synthesis of branched insoluble polyphosphonates using either sodium phenolate or TPPP. In comparing the results, when the reaction is performed with sodium phenolate, the reaction is slightly faster, exhibits a higher melt viscosity and a higher Tg, both indicative of higher molecular weight, and provides a higher yield of polymer. In addition, sodium phenolate is less expensive and less volatile than TPPP.

TABLE 1

Effect of Catalyst on Polyphosphonate Properties

| Reaction Information | Example 2 | Example 3 | Example 4 | Example 5 |
| --- | --- | --- | --- | --- |
| Excess of Monomers | 4.9% OH monomers | 4.9% OH monomers | 0.1 mol % DPP | 0.5 mol % OH monomers |
| Branching Agent Amount | 2 mole % | 2 mole % | 2 mole % | 2 mole % |
| Catalyst | TPPP | Sodium Phenolate | TPPP | Sodium Phenolate |
| Total Feed, g | 7224 | 7092 | 2810 | 2801 |
| Total Reaction Time, h | 14.5 | 14 | 15.25 | 12.5 |
| Relative Viscosity | Insoluble | Insoluble | Insoluble | Insoluble |
| Tg, ° C. | 97 | 100 | 104 ± 1 | 102 ± 1 |
| Yield of Polymer, g | 3560 | 3748 | 1591 | 1542 |
| Melt Viscosity @100 rpm and 300° C., Torque* | 36 | 56 | 13.5 | 14.6 |

*Examples 2 and 3 were prepared on a different reactor then Examples 4 and 5. The determination of melt viscosity using torque is dependant on the equipment. Therefore, Examples 2 and 3 can be compared to each other but must be compared separately from Examples 4 and 5, and Examples 4 and 5 can be compared to each other but must be compared separately from Examples 2 and 3.

Table 2 shows a comparison between polybutylene terephthalate (PBT) alone and PBT blends including branched polyphosphonates prepared as describe in Example 2 using Tetraphenylphosphonium Phenolate (TPPP) as a catalyst (Composition 1) and those described in Example 3 using sodium phenolate as a catalyst (Composition 2). These results presented indicate that the branched insoluble polyphosphonates prepared using sodium phenolate exhibit better flame resistance than those prepared using TPPP. This improved performance may be due to the increased molecular weight of the branched insoluble polyphosphonates prepared using sodium phenolate catalyst.

TABLE 2

Characterization of PBT/Polyphosphonate Blends

| | Composition 1 | Composition 2 | PBT |
|---|---|---|---|
| Composition Components | | | |
| PBT with 30% GF | 73% | 73% | 100% |
| Polyphosphonate from Example 2 | 26% | | |
| Polyphosphonate from Example 3 | | 26% | |
| Teflon | 0.4% | 0.4 | |
| K-0160 (C4-salt) | 0.6% | 0.6% | |
| Properties | | | |
| Burn test | | | |
| 0.8 mm | V2 | V0 | HB |
| Flaming drip | yes | No | |
| MFI 250° C. 10 minute exposure/ 2.16 kg load, g | 8.34 | 10.6 | 5.0 |
| HDT 1.82 MPa (° C.) | 101 | 102 | 194 |

PBT = (PF300G6, PBT mixed with glass fiber from Polygram)
K-0160 (C4-salt) = master batch containing 15% potassium salt of perflurobutanesulfonic acid and 85% Makrolon polycarbonate. Total amount of potassium salt of perfluorobutanesulfonic acid in the blends was 0.09% by weight.

We claim:

1. A method for producing branched insoluble polyphosphonates comprising:
    combining one or more phosphonic acid diaryl esters and one or more bisphenol in a reaction vessel to form a reaction mixture;
    adding an alkali catalyst to the reaction mixture;
    heating the reaction mixture for a first time under vacuum to a temperature where phenol begins to distill from the vessel and continuing heating until evolution of phenol has stopped; and
    heating the reaction mixture for a second time to a temperature where evolution of at least phenol has restarted and has stopped and a resulting branched insoluble polyphosphonate been generated that is partially or completely insoluble in methylene chloride or tetrahydrofuran after 8 hours of immersion;
    wherein heating is carried out for a total of about 12 hours to about 16 hours.

2. The method of claim 1, wherein the step of heating the reaction mixture for a second time is carried out for a time that is at least equal to the step of heating the reaction mixture for a first time.

3. The method of claim 1, wherein a melt viscosity of the reaction mixture increases by at least about 10 times during the step of heating the reaction mixture for a second time.

4. The method of claim 1, wherein the step of heating the reaction mixture for a first time and heating the reaction mixture for a second time are carried out concurrently such that heating is uninterrupted.

5. The method of claim 1, wherein the reaction mixture comprises up to about 20 mole % molar excess of the bisphenol or up to about 20 mole % molar excess of the phosphonic acid diaryl ester.

6. The method of claim 1, wherein the catalyst is sodium associated with an anion.

7. The method of claim 1, wherein the alkali catalyst is sodium phenolate.

8. The method of claim 1, further comprising adding a branching agent to the reaction mixture.

9. The method of claim 8, wherein the branching agent is 1,1,1-tris(4-hydroxyphenyl)ethane.

10. The method of claim 1, wherein the phosphonic acid diaryl ester is of general structure:

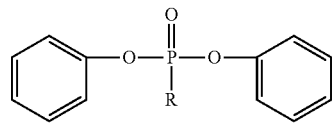

wherein R is a lower alkyl aliphatic hydrocarbon, a $C_1$-$C_4$, cycloaliphatic or aromatic.

11. The method of claim 1, wherein the bisphenol is selected from 4,4'-dihydroxybiphenyl, 2,2-bis(4-hydroxyphenyl)propane (bisphenol A), 1,1-bis(4-hydroxyphenyl)-3,3-dimethyl-5-methyl cyclohexane (TMC), 1,3-dihydroxybenzene (resorcinol), 1,4-dihydroxybenzene (hydroquinone) and combinations thereof.

12. The method of claim 1, wherein the molar amount of catalyst is from 0.00004 to about 0.001 moles per 1 mole of bisphenol.

* * * * *